United States Patent Office 3,124,589
Patented Mar. 10, 1964

3,124,589
CERTAIN 2-ALKYLAMINO POLYMETHYLENE OXAZOLINES
George I. Poos, Ambler, and Raymond R. Wittekind, Philadelphia, Pa., assignors to McNeil Laboratories, Incorporated, Philadelphia, Pa., a corporation of Pennsylvania
No Drawing. Filed July 2, 1959, Ser. No. 824,484
2 Claims. (Cl. 260—307)

This invention relates to new chemical compounds possessing central nervous system stimulant activity and to a method of making the same.

It is an object of this invention to provide new chemical compounds which are fused oxazolines.

A particular object of this invention is to provide novel chemical compounds characterized by central nervous system stimulant activity.

Another object is to provide a novel method of making the stated compounds.

These and other objects will become evident from a consideration of the following specification and claims.

The novel fused oxazolines provided by the present invention are 2-alkylamino-4,5-polymethylene oxazolines of the base formula

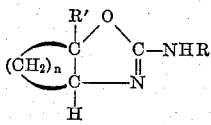

where R is an alkyl group containing from 1 to 4 carbon atoms; where R' is selected from the group consisting of hydrogen and alkyl groups containing from 1 to 4 carbon atoms, and where n is an integer selected from 3 and 4.

It has been found that the stated compounds can be prepared by a method comprising the ring cyclization of the appropriate N-2-iodocycloalkyl-N'-alkylureas, as further described in detail hereinafter. The overall procedure by which the compounds can be produced starting from the appropriate cycloalkenes is represented by the following series of equations:

(I) 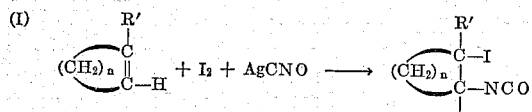

(II) 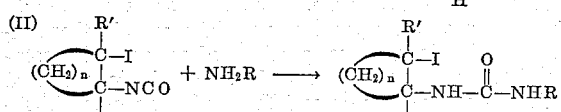

(III) 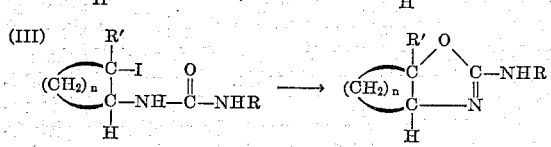

R, R' and n in the above formulae are as defined above in connection with the generic formula.

A particularly outstanding and advantageous property of the novel products of this invention are their ability to produce stimulation of the central nervous system at dosage levels which produce no significant stimulation of the cardiovascular system. Deep and pervasive states of depression are overcome by administration of the stated compounds.

As stated in the foregoing generic formula n may be 3 or 4. Thus, the ring represented by

may be a five-membered ring in which case the compounds are a 2-alkylamino-3a,4,5,6-tetrahydrocyclopentoxazoline, or a six-membered ring in which case the compound is a 2-alkylamino-3a,4,5,6,7,7a-hexahydrobenzoxazole. R' in the generic formula may be hydrogen and R and R$_1$, individually, may be alkyl groups containing from 1 to 4 carbon atoms, that is methyl, ethyl n-propyl, isopropyl, n-butyl, sec.butyl and tert.-butyl. Typical compounds of the invention are 2-methylamino-3a,4,5,6-tetrahydrocyclopentoxazoline, 2-tert.butylamino-6a-methyl-3a,4,5,6-tetrahydrocyclopentoxazoline, 2-sec.butylamino-6a-sec.butyl-3a,4,5,6-tetrahydrocyclopentoxazoline, 2-methyl-amino-3a,4,5,6,7,7a-hexahydrobenzoxazole, 2-methylamino-7a-methyl-3a,4,5,6,7,7a-hexahydrobenzoxazole, 2-ethylamino - 3a,4,5,6,7,7a - hexahydrobenzoxazole, 2-methylamino-7a-tert.butyl-3a,4,5,6,7,7a - hexahydrobenzoxazole, 2-sec.butylamino - 3a,4,5,6,7,7a - hexahydrobenzoxazole, 2-sec.butylamino-7a-sec.butyl - 3a,4,5,6,7,7a - hexahydrobenzoxazole.

For the preparation of the stated fused oxazolines in accordance with the series of steps illustrated by the equations shown above, as a first step, the appropriate cycloalkene is reacted with iodine and a cyanate salt. Conveniently, the latter salt will constitute silver cyanate; the iodide of silver precipitates and can easily and readily be separated from the reaction mixture. The reaction of the cyclic olefin with the stated reactants will be conducted in an inert solvent such as ether or the like. Generally, ambient conditions of temperature and pressure permit the reaction to proceed at a satisfactory rate, and usually no advantage is to be gained by departing from these conditions. The product is an N-2-iodocycloalkyl isocyanate.

This isocyanate, in the next step, is converted to a urea by reaction with an alkylamine. The reaction of these substances will also be conducted in an inert solvent or diluent such as ether. It proceeds with facility, and indeed, the rate of reaction will preferably be moderated by cooling the reaction mixture to below room temperature. Temperatures down to about 0° C. are favorable. Ordinarily ambient pressure conditions will be maintained during this step, although the pressure may be varied if desired. As the reaction proceeds, the product separates out and can be readily isolated if desired. It constitutes an N-2-iodocycloalkyl-N'-alkylurea.

The stated N-2-iodocycloalkyl-N'-alkylurea is cyclized to convert it to the desired product as provided by this invention. This may be accomplished by treating the iodourea to effect ring closure. Conveniently, the iodourea is heated in a solvent or diluent, although heating is not always necessary and cyclization may take place at room temperature. Water is the diluent of choice, but organic liquids, such as methanol and ethanol, may alternatively be used. The iodourea is thus converted to the corresponding 2-alkylamino-4,5-polymethylene oxazoline hydroiodide.

To isolate the product fuzed oxazoline when the cyclization is effected in an aqueous medium, the reaction mixture will be made basic by addition of a base such as sodium hydroxide. The fused oxazoline can then be extracted from the aqueous medium with an organic solvent—suitably, methylene chloride. The solvent is removed by evaporation to leave the crude product which can, if desired, be purified by further treatment, such as vacuum distillation or recrystallization.

Some of the presently provided products are in the form of viscous oils and some in the form of crystalline solids. They are bases, and can be converted by reaction with acids to form salts. Such salts are generally equivalents of the bases, and can be used interchangeably therewith for many purposes. The salts are usually substantially more water soluble than the base itself, and for this reason, may be preferred for use in various applications.

To prepare salts of the fused oxazoline it is merely reacted with an equivalent amount of a selected acid. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and dibasic acids, such as the citrate, tartrate, malate, maleate, fumarate and picrate.

If a salt is to be administered to produce physiological effects, it will be pharmaceutically acceptable. Any toxicity or undesirable effects which may be imparted by the salt-forming acid will be taken into consideration in the selection of the salt, as is well known in the art. Pharmaceutically, a useful salt should not be substantially more toxic than the compound itself and should be able to be incorporated in the liquid or solid pharmaceutical media for preparation of therapeutically useful compositions. Such pharmaceutically useful salts are full equivalents of the base from which they are derived for the present purposes, and are included herein and in the claims where reference is made to the 2-alkylamino-4,5-polymethylene oxazolines.

The invention is illustrated but not limited by the following examples.

*Example I*

This example illustrates the preparation of 2-methylamino-3a,4,5,6,7,7a-hexahydrobenzoxazole.

A solution of 127 g. of iodine (0.500 mole) in 1000 ml. of anhydrous ether is added dropwise with stirring over a 3-hour period to a suspension of freshly prepared silver cyanate (79.0 g., 0.527 mole) and redistilled cyclohexene (41.0 g., 0.500 mole) in 200 ml. of anhydrous ether. After the addition is complete, the mixture is stirred for 1 hour. The silver iodide precipitate is collected on a filter and washed thoroughly with ether to extract entrained product. One-half of the resulting ethereal solution of 2-iodocyclohexyl isocyanate (0.25 mole) is cooled in an ice bath. Methylamine (7.8 g., 0.5 mole) in 100 ml. of anhydrous ether is added dropwise thereto over 5 minutes with stirring. The N-(2-iodocyclohexyl)-N'methylurea thus formed is collected and washed with ether and then cold acetone until the filtrate is almost colorless, at which point it melts at 118°–120° C. (decomp.).

To prepare the fused oxazoline, an aqueous suspension of 16.0 g. (0.0569 mole) of the iodourea prepared as described in the preceding paragraph is heated at reflux for 5 hours. The reaction mixture is cooled and filtered to remove undissolved material, and the filtrate, cooled at 0° C, is made basic by addition of a cold solution of sodium hydroxide (8.5 g., 0.20 mole) in 100 ml. of water. The aqueous solution is then extracted with methylene chloride and the combined organic extracts are washed with saturated sodium chloride solutions until neutral. The organic solution is dried and the solvent evaporated to leave a residue of 5.69 g. of crude product. Distillation of this product from an oil-jacketed flask gives 2-methylamino-3a,4,5,6,7,7a-hexahydrobenzoxazole as a colorless viscous oil, B.P. 110°–120° C. (bath temperature, 0.2 mm.). The infrared spectrum of the stated compound shows $$\lambda_{max.}^{CHCl_3}\ 2.90,\ 3.43,\ 6.02,\ 6.60,\ 6.89\mu$$

*Example II*

This example describes the preparation of a salt of 2-methylamino-3a,4,5,6,7,7a-hexahydrobenzoxazole.

To prepare the maleate salt, 3.23 g. (0.0209 mole) of the methylaminobenzoxazole prepared as described in Example I is dissolved in 5 ml. of absolute methanol. A solution of 2.66 g. (0.0229 mole) of maleic acid in 10 ml. of methanol is added to this solution. After one hour, the solvent is removed under vacuum to produce a pale yellow oil. This is crystallized with ether to give 5.00 g. of crystalline solid, which is in turn recrystallized from a methanol-ether mixture, to furnish the pure acid maleate salt of 2-methylamino-3a,4,5,6,7,7a-hexahydrobenzoxazole, M.P. 122°–124° C. The analysis calculated for $C_{12}H_8N_2O_5$ is C, 53.32; H, 6.71; N, 10.37. That found is C, 53.43; H, 6.42; N, 10.49. The infrared spectrum of this product shows $$\lambda_{max.}^{Nujol}\ 3.42,\ 5.86,\ 6.32,\ 6.73,\ 6.90\mu$$

*Example III*

This example describes another preparation of a salt of 2-methylamino-3a,4,5,6,7,7a-hexahydrobenzoxazole.

The methylaminobenzoxazole prepared as described in Example I is reacted with methanolic picric acid, by a procedure substantially as described in Example II. The picrate salt of 2-methylamino-3a,4,5,6,7,7a-hexahydrobenzoxazole is obtained in 94% yield. After recrystallization from a mixture of isopropyl alcohol and water, it melts at 171°–172° C. The calculated analysis for $C_{14}H_{17}N_5O_8$ is C, 43.86; H, 4.47; N, 18.27. That found is C, 44.02; H, 4.59; N, 18.26. The spectra of this salt show $$\lambda_{max.}^{Nujol}\ 3.08,\ 5.87,\ 6.12,\ 6.36,\ 6.45,\ 6.99,\ 7.33\mu;\ \lambda_{max.}^{MeOH}\ 326\mu$$
$$(14,200)$$

*Example IV*

This example describes the preparation of 2-methylamino-3a,4,5,6-tetrahydrocyclopentoxazoline.

A solution made by dissolving 43.2 g. (0.34 mole) of iodine in 400 cc. of ether is added dropwise to a stirred suspension of 11.5 g. (0.17 mole) of cyclopentene, 26.9 g. (0.18 mole) of silver cyanate and 100 cc. of ether. After about 2 hours, when all the iodine is added, the mixture is stirred at room temperature for an hour and then filtered. The filtrate is cooled and, with stirring, is treated with 5.27 g. (0.17 mole) (21 g. of a 25% aqueous solution) of methylamine. The solution is allowed to stand at room temperature overnight and is then extracted with four 75 cc. portions of water. The combined aqueous extracts are cooled, made basic, extracted with methylene chloride and the methylene chloride extracted is evaporated. The resulting oily solid is treated with 150 cc. of water and heated in a steam bath until dissolved. The solution is then cooled, made basic and extracted with methylene chloride. The methylene chloride extract is evaporated. The resulting material is recrystallized twice from ether-petroleum ether to give 2-methylamino - 3a,4,5,6 - tetrahydrocyclopentoxazoline, M.P. 80–82° C.

An infrared spectrum shows $$\lambda_{max.}^{Nujol}\ 3.12,\ 3.26,\ 6.02,\ 6.40,\ 7.02\mu$$

The calculated nitrogen analysis for $C_7H_{12}N_2O$ is: N, 19.99. That found is: N, 19.99, 19.86.

Salts of this compound are prepared as in Examples II and III.

Likewise, ethyl-, propyl-, or butylamine may be used in place of methyl amine, and by using the appropriate methyl-, ethyl-, propyl-, or butyl-substituted cyclopentene the corresponding 2-alkylamino-6a-alkyl-3a,4,5,6-tetrahydrocyclopentoxazolines are prepared following typical procedures set forth in these examples.

*Example V*

The example illustrates the preparation of 2-ethylamino-3a,4,5,6,7,7a-hexahydrobenzoxazole.

A solution made by dissolving 50.8 g. (0.4 mole) of iodine in 400 cc. of ether is added dropwise to a stirred suspension of 16.4 g. (0.2 mole) of cyclohexene, 31.5 g. (0.21 mole) of silver cyanate and 100 cc. of ether. After about 2 hours, when all the iodine has been added, the mixture is stirred at room temperature for an hour and then filtered. The filtrate is cooled, stirred and treated with 9 g. (0.2 mole; 13 g. of a 70% aqueous solution) of ethylamine. After all the amine has been added, the solution is stirred at room temperature for an hour and then filtered. The residue is treated with 200 cc. of water and heated to reflux to dissolve the solid. The hot solution is filtered, cooled, made basic and extracted with methylene chloride. After the methylene chloride is evaporated from the extract, the resulting oily solid is recrystallized twice from ether-petroleum ether giving 2-ethylamino-3a,4,5,6,7,7a-hexahydrobenzoxazole melting at 58–60° C.

An infrared spectrum shows $\lambda^{Nujol}_{max.}$ 3.13, 6.00, 6.07, 6.41, 6.71, 6.83, 6.87$\mu$ The calculated nitrogen analysis for $C_9H_{16}N_2O$ is: N, 16.65. That found: N, 16.75, 16.27.

Salts of this compound are prepared as in Examples II and III.

*Example VI*

This example illustrates the preparation of 2-methylamino-7a-methyl-3a,4,5,6,7,7a-hexahydrobenzoxazole and its fumarate salt.

A solution of 50.8 g. (0.4 mole) of iodine in 400 cc. of ether is added dropwise to a stirred suspension of 19.2 g. (0.2 mole) of 1-methyl-1-cyclohexene, 31.5 g. (0.21 mole) of silver cyanate and 100 cc. of ether. After all the iodine has been added (about 2 hours), the solution is stirred at room temperature for an hour and filtered. The filtrate is cooled, stirred and treated with 6.2 g. (0.2 mole; 25 g. of a 25% aqueous solution) of methylamine. After all the amine has been added, the solution is stirred at room temperature for an hour and filtered. The filtrate is extracted with five 50 cc. portions of water to provide an aqueous solution and an ether solution.

The aqueous solution is cooled, made basic and extracted with methylene chloride. The methylene chloride is evaporated to provide 2-methylamino-7a-methyl-3a,4,5,6,7,7a-hexahydrobenzoxazole in the form of an oil.

An infrared spectrum on this product shows $\lambda^{Neat}_{max.}$ 3.12, 3.40, 3.48, 6.03, 6.51, 6.89, 7.03$\mu$ The ether solution is evaporated and the residue dissolved in chloroform. The chloroform solution is extracted with three 50 cc. portions of 1 N hydrochloric acid. The acid extract is cooled, made basic and extracted with methylene chloride. The methylene chloride extract is evaporated to yield further 2-methylamino-7a-methyl-3a,4,5,6,7,7a-hexahydrobenzoxazole in the form of an oil.

An infrared spectrum on this product shows $\lambda^{Neat}_{max.}$ 3.09, shl. 3.28, 3.40, 3.46, 6.03, 6.06, 6.43, 6.52, 6.87, 7.02$\mu$ The above two products are combined and dissolved in ether, the solution treated with charcoal, filtered and evaporated to yield a light yellow oil.

This oil is dissolved in methanol and added to a methanol solution of fumaric acid containing 6 g. of fumaric acid. The salt is precipitated with ether and recrystallized twice from methanolether to give 2-methylamino-7a-methyl-3a,4,5,6,7,7a-hexahydrobenzoxazole fumarate, melting at 147–149° C.

An infrared spectrum on this compound shows $\lambda^{Nujol}_{max.}$ 5.78, 7.02$\mu$ The calculated nitrogen analysis for $C_9H_{16}N_2O \cdot C_4H_4O_4$ is: N, 9.85. That found is N, 9.89, 9.82.

This compound has been designated the 7a-methyl derivative, as distinguished from the 3a-methyl derivative, based on theoretical considerations, and it is believed that 2-methylamino-3a-methyl - 3a,4,5,6,7,7a-hexahydrobenzoxazole, if formed at all, is present only in a small amount.

By substituting the appropriate ethyl-, propyl- or butyl-substituted cyclohexene for the 1-methyl-1-cyclohexene the corresponding 7a-ethyl, -propyl, and -butyl derivatives are produced.

*Example VII*

This example illustrates the preparation of 2-isopropylamino-3a,4,5,6,7,7a-hexahydrobenzoxazole.

Iodine (80.9 g.; 0.320 mole) in 500 cc. of ether is added dropwise over 3 hours to a stirred suspension of 51.0 g. (0.340 mole) of silver cyanate, 26.2 g. (0.320 mole) of cyclohexene and 100 cc. of ether. The reaction mixture is stirred at room temperature for an additional hour. The silver iodide is collected on a filter and washed thoroughly with ether. The combined filtrates are cooled to 0° C. in an ice bath, and a solution of 18.8 g. (0.320 mole) of isopropyl amine in 100 cc. of ether is added dropwise over a period of an hour with stirring. The 1-(2-iodocyclohexyl)-3-isopropylurea is crystallized from the reaction mixture and collected, and then washed with ether followed by acetone.

The resulting product (44.0 g., 0.141 mole) is suspended in 600 cc. of water and the mixture is heated at reflux for an hour. The resulting homogeneous solution is cooled to 0° C., made basic by the slow addition of a cold aqueous solution of 64 g. (1.6 moles) of sodium hydroxide, and extracted with methylene chloride. The combined extracts are washed with saturated sodium chloride until neutral and then evaporated. The oily residue is then crystallized with ether to give a waxy solid. Fractional crystallization of this material from ether, followed by repeated recrystallization from etherpetroleum ether give 2-isopropylamino-3a,4,5,6,7,7a-hexahydrobenzoxazole melting at 86°–92° C.

An infrared spectrum on the product shows:

$\lambda^{CHCl_3}_{max.}$ 2.93, 6.05, 6.60$\mu$

The calculated analysis for $C_{10}H_{18}N_2O$ is: C, 65.89; H, 9.96; N, 1537. That found is: C, 65.84; H, 9.90; N, 15.37, 15.30.

The activity of the presently provided novel compounds as central nervous system stimulants is demonstrated by their ability to counteract the depressant effects of reserpine. Thus, in a reserpine challenge test, six rabbits were given (i.v.) 6 mg./kg. reserpine. After 2½ hours all of the rabbits exhibited symptoms of severe depression: all were lying down with all four legs outspread and chin on floor, and could not be made to stand. An 0.5% saline solution of the 2-methylamino-3a,4,5,6,7,7a-hexahydrobenzoxazole maleate was then administered i.v. at a rate of 5 mg./kg. to three of the six rabbits. Thirty minutes later, two of the three treated rabbits had returned substantially to normal, and were on their feet and able to stand. The control, untreated rabbits were all still in the described depressed state.

While the invention has been described with reference to various particular preferred embodiments thereof, it is to be understood that modifications and variations may be made within the scope of the present invention.

What is claimed is:
1. 2-alkylamino-3a,4,5,6-tetrahydrocyclopentoxazolines having the formula

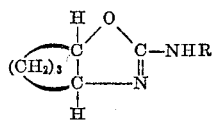

where R is an alkyl group containing from 1 to 4 carbon atoms.

2. 2-methylamino-3a,4,5,6 - tetrahydrocyclopentoxazoline.

References Cited in the file of this patent

Birkenbach et al.: Chem. Abstracts, volume 25, page 3617 (1931).
Birkenbach et al.: Ber. Deut. Chem., volume 66B, pages 1575–6 (1933).
Elderfield: "Heterocyclic Compounds," volume 5, pages 384–5 (1957).

UNITED STATES PATENT OFFICE
CERTIFICATE OF CORRECTION

Patent No. 3,124,589            March 10, 1964

George I. Poos et al.

It is hereby certified that error appears in the above numbered patent requiring correction and that the said Letters Patent should read as corrected below.

Column 3, line 60, for "0.5" read -- 0.25 --.

Signed and sealed this 18th day of August 1964.

(SEAL)
Attest:

ERNEST W. SWIDER            EDWARD J. BRENNER
Attesting Officer            Commissioner of Patents